W. J. KNOX.
JOINT PACKING.
APPLICATION FILED MAY 9, 1908.
911,822.
Patented Feb. 9, 1909.
3 SHEETS—SHEET 3.
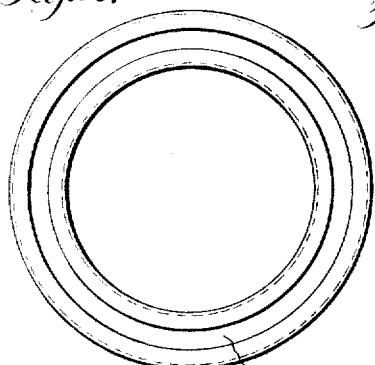
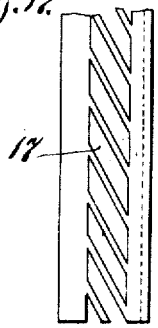
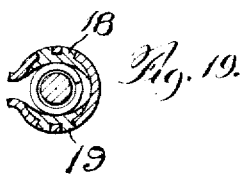
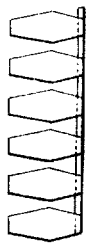
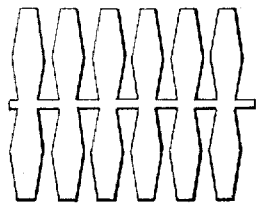
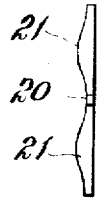
WITNESSES
Harry L. Lechner
J. C. Bradley
INVENTOR
Wm. J. Knox
by atty
Paul Synnestvedt

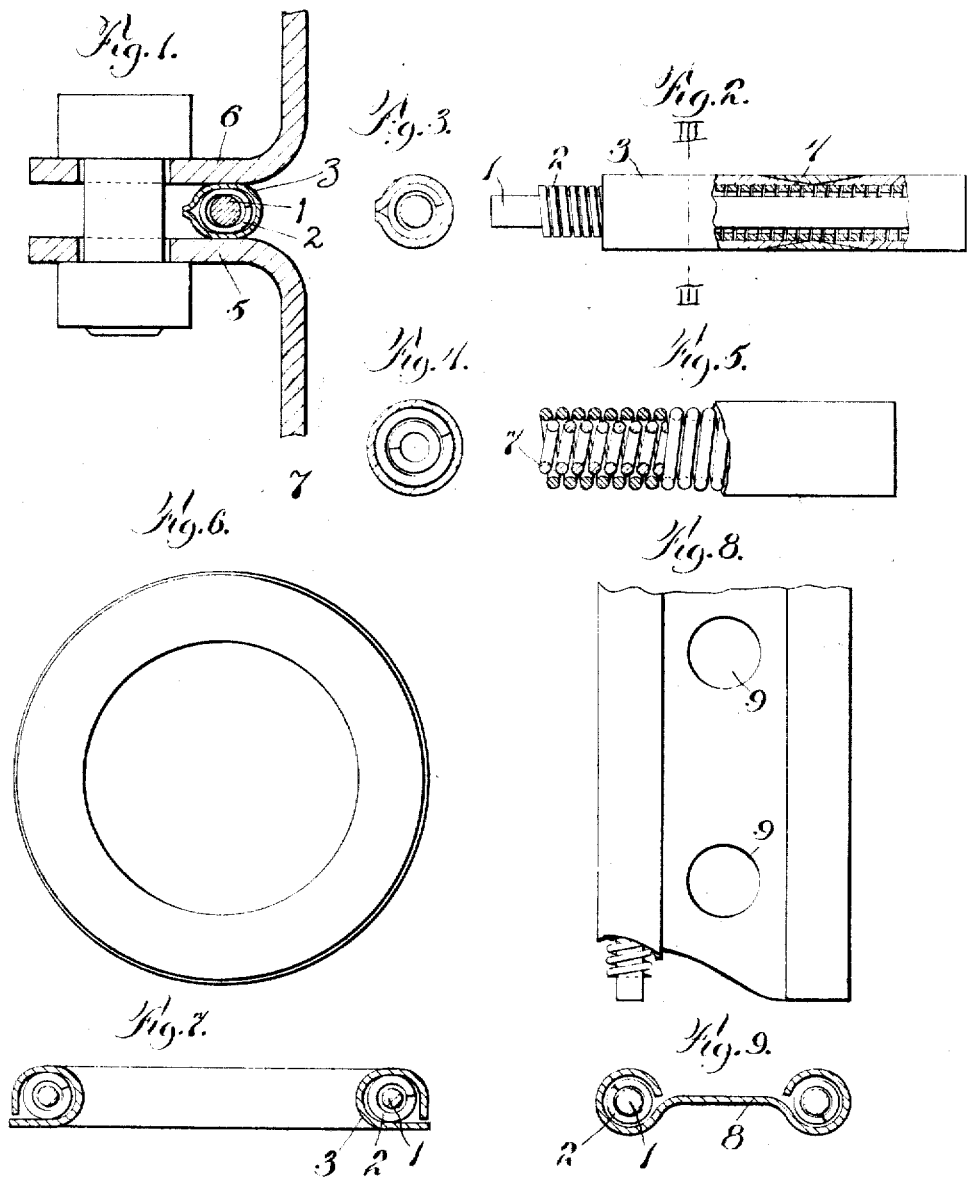

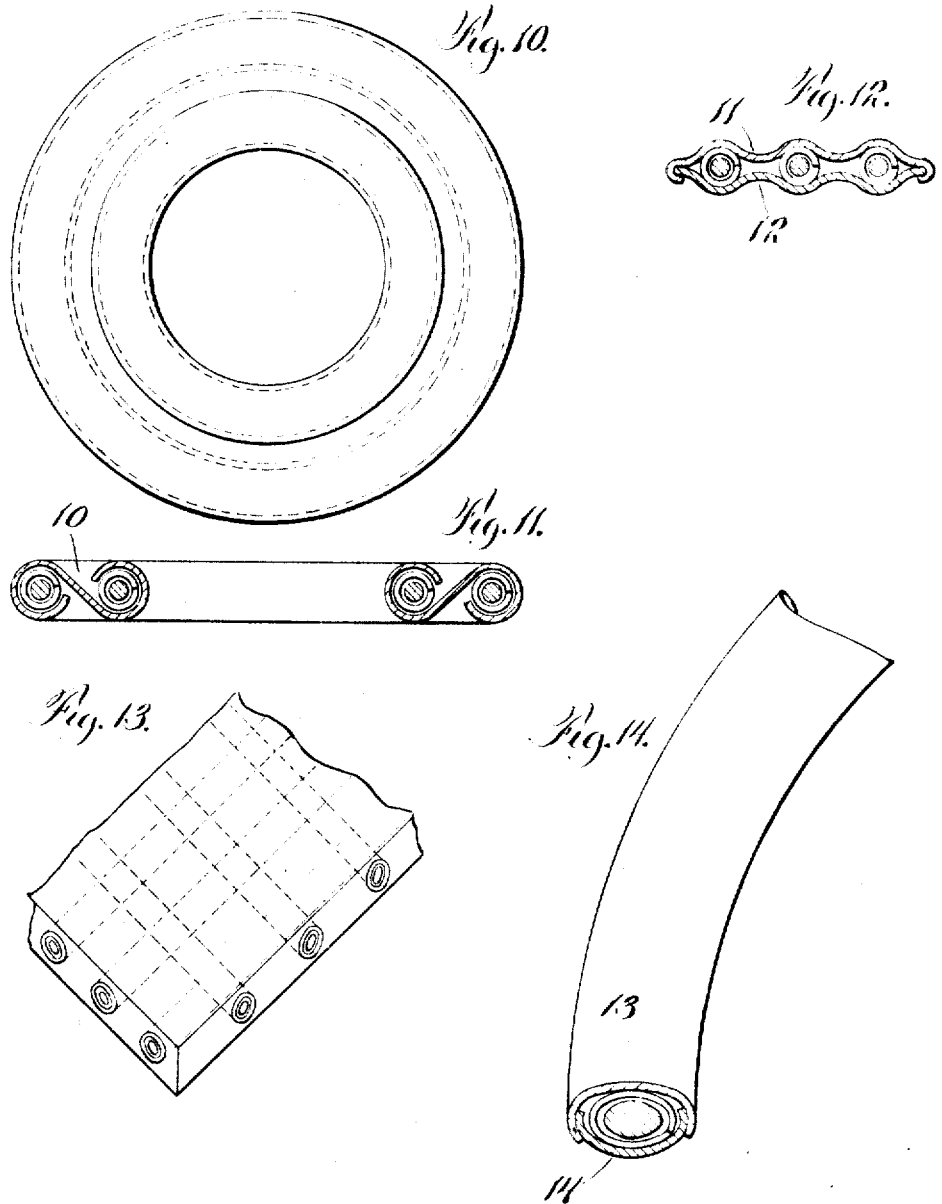

UNITED STATES PATENT OFFICE.

WILLIAM J. KNOX, OF DUBOIS, PENNSYLVANIA, ASSIGNOR OF ONE-FOURTH TO DAVID M. KNOX, OF DENVER, COLORADO.

JOINT-PACKING.

No. 911,822.      Specification of Letters Patent.      Patented Feb. 9, 1909.

Application filed May 9, 1908. Serial No. 431,916.

*To all whom it may concern:*

Be it known that I, WILLIAM J. KNOX, a citizen of the United States, residing at Dubois, in the county of Clearfield and State of Pennsylvania, have invented certain new and useful Improvements in Joint-Packing, of which the following is a specification.

The invention relates to packing for making tight joints between opposing faces of all descriptions; and has for its principal objects; the provision of an improved form of packing wherein an elastic contact and perfect joint is secured under varying conditions of heat and pressure; the provision of a packing adapted to resist chemical action and capable of application to a wide variety of uses; and the provision of a packing whose resilient properties are in no way affected or impaired by heat. Certain embodiments of the invention are illustrated in the accompanying drawings, wherein:—

Figure 1 is a section showing one application of one form of the packing,

Figure 2 is a partial side elevation and partial longitudinal section through the packing or gasket of Figure 1, the ring joint for the ends being shown, Figure 3 is a section on the line III—III of Figure 2, Figures 4 and 5 are sectional views of a modified form of packing.

Figures 6 and 7 are plan and sectional views respectively of a gasket embodying the invention wherein one spring coil is employed, Figures 8 and 9 are plan and sectional views respectively of another modification wherein two spring coils are employed, Figures 10 and 11 are plan and sectional views respectively of a disk gasket employing two coils, Figure 12 is a section through a still different form of gasket employing three coils, Figure 13 is a perspective view of a packing fabric in which a number of coils are embedded, Figure 14 is a perspective view of a modified form of gasket wherein the core, coil, and casing are oval in cross section and the casing is formed of two metal plates, Figures 15 and 16 are plan and sectional views respectively of a modified form of gasket, Figures 17 and 18 illustrate modified forms of outer casing, Figure 19 is a section through a gasket employing the casing of Figure 18, Figures 20, 21 and 22 are plan views of various forms of spring members which may be used in lieu of the coil springs illustrated in the preceding figures, Figures 23 and 24 are end views of the members shown in Figures 21 and 22 respectively after such members have been bent, and Figure 25 is an end view of the spring member of Figure 21 before such member has been bent.

Referring first to the form of packing or gasket as shown in Figures 1, 2 and 3 of the drawing, 1 is the central supporting core of metal, 2 is the spring sheathing imposed over the core and comprising a coil spring which may be of any desired cross section, and which is preferably applied loosely over the core 1, and 3 is a casing of pliable material, which material may be either soft metal or of some fibrous non-metallic texture, such as asbestos or rubber. The means for joining the two ends of the packing is illustrated in Figure 2. As here shown the opposing ends of the casing 3 are tapered and the correspondingly tapered joint ring 4 is applied. The joining point of the core 1 and sheathing 2 are made to come at some point not in line with the joint in the casing 3.

When the packing or gasket is applied as shown in Figure 1, the approach of the flange members 5 and 6 causes the deformation of the gasket to the oval form shown. The opposite sides of the spring sheathing 2 are pressed against the supporting core, and the resiliency of this spring sheathing or coil 2, maintains the casing 3 in tight engagement with the flanges 5 and 6, even though these members should recede from each other a certain amount. The solid or resistant core 1 serves to prevent a compressing of the sheathing 2 to such an extent that it will not return to its normal contour, and serves to hold the coils in their proper positions when the pressure is applied. The pliable outer covering 3 serves to make a good contact with the surfaces to be packed, and the space between the core 1 and resilient sheathing 2 permits of the desired amount of compression of such sheathing before it contacts with the supporting core. When the outer casing 3 is made of metal, the packing is peculiarly adapted for use with high temperatures or for chemical containers where the covering must be of a composition to resist the action of the chemical, or where the vessel contains beverages or foods in the course of preparation, and which for hygienic reasons must be periodically washed and scrubbed.

Figures 4 and 5 illustrate a modified construction wherein a coil spring 7 is substituted for the solid core 1 in the other form of device. Under certain conditions it is desirable to have the core somewhat yielding and this construction provides the desired yielding.

Figures 6 and 7 illustrate the invention as applied to a disk gasket, the packing member being woven continuous. The core, flexible sheathing, and outer casing are substantially the same as in the form of device of Figures 1, 2 and 3.

Figures 8 and 9 illustrate a form of gasket or packing wherein a pair of independent cores and coils are employed, the whole being provided with a single outer casing 8. Where a series of holding bolts are used, one of the coils lies on one side of the bolts, and the other coil on the other side, the openings 9 serving for the passage of the bolts.

Figures 10 and 11 illustrate another form of disk gasket wherein two separate coils are employed with a single outer casing 10 arranged substantially in cross section in the form of a figure 8. Figure 12 illustrates in cross section still another form of gasket wherein three coils are employed with an outer casing consisting of the two members 11 and 12 interlocked at their outer edges. It is obvious that the number of coils might be changed to suit conditions. Figure 13 illustrates a fabric wherein the invention is employed, such fabric having oppositely disposed sets of coils embedded in the body of the fabric, which body may be of any desired fibrous composition. Each of the coils employed has the supporting core and the resilient sheathing imposed thereover. Figure 14 illustrates a form of the packing wherein the cross section is oval instead of circular, and wherein two casing sheets 13 and 14 are employed instead of the single one shown in Figures 1, 2 and 3.

The gasket shown in Figures 15 and 16 differs from those heretofore described, in that one side of the casing 15 is slotted and the space filled as illustrated in Figure 16 with some flexible material such as the asbestos 16. This form of gasket is especially desirable where the joint surfaces are uneven or have been cut or pitted. The joint will be made by the soft metal casing 15 as in the other forms of device, but the imperfections in the surfaces or sheets will be filled by the asbestos 16. Instead of providing the casing 15 with the continuous slots shown, such casing may be provided with a plurality of diagonal slots 17 as illustrated in Figure 17 if so desired. The asbestos will press out through these diagonal slots and perform the same function as when used in connection with the slots shown in Figure 15. The slots are made diagonal so that they will over-lap each other, and give an asbestos engaging surface at all points throughout the length of the gasket. Figure 18 illustrates a casing sheet provided with two sets of slots so arranged that one set come on one side of the gasket, and the other set come on the other side. The application of this sheet to a gasket is illustrated in the cross section of Figure 19, the asbestos members 18 and 19 giving flexible sheathing surfaces on opposite sides of the gasket.

Figures 20, 21 and 22 illustrate blanks from which sheathing may be bent to take the place of the coil spring 2 of Figures 1, 2 and 3, when it is desired to have a sheathing somewhat more yielding and flexible than that formed by the coil spring. The blanks are bent in approximate U form shown in Figures 23 and 24, and constitute flexible tubes of a very resilient character. The section of the sheathing shown in Figure 21 is preferably of the form illustrated in Figure 25, being reduced in thickness at the central portion 20 and expanded at the end portions 21.

It will be apparent that all the types of gasket described employ resilient means other than the rubber which has usually been employed heretofore in order to furnish the necessary elasticity for giving a tight joint. This is exceedingly desirable as substances such as rubber deteriorate in use, and their elastic properties are destroyed in the course of time. The gaskets herein described and illustrated are obviously not subject to this disadvantage as the resilient means is not affected by heat, and is thoroughly protected by the outer casing, so that the packing is substantially as effective after long use as when first put into service. Various other utilities and advantages of the construction will be apparent to those skilled in the art.

Having thus described my invention and illustrated its use, what I claim as new and desire to secure by Letters Patent is the following:—

1. In combination in a packing, a resistant core, a spring sheathing over the core, and a casing of pliable material over the sheathing.

2. In combination in a packing, a supporting core, a resilient sheathing over the core, and a casing of pliable material over the sheathing.

3. In combination in a packing, a supporting core, a spring sheathing loosely engaging the core, and a casing of pliable material over the sheathing.

4. In combination in a packing, a supporting core, a spring sheathing over the core, and a casing of pliable metal over the sheathing.

5. In combination in a packing, a supporting core, a spring sheathing over the core, and a casing of soft metal over the sheathing.

6. In combination in a packing, a metal core, a spring sheathing over the core, and a casing of pliable material over the sheathing.

7. In combination in a packing, a resistant core, a coil spring sheathing over the core, and a casing of pliable material over the sheathing.

8. In combination in a packing, a supporting core, a spring sheathing over the core, and a casing of metal over the sheathing.

9. In combination in a packing, a supporting core, a spring sheathing over the core, a casing of metal for the sheathing having an open space along the side and yielding material interposed between the open space and the sheathing.

10. In combination in a packing, a supporting core, a spring sheathing over the core, a casing of metal for the sheathing having open spaces along the opposite sides, and yielding material interposed between the open spaces and the sheathing.

11. In combination in a packing, a supporting core, a spring sheathing over the core, a casing of metal for the sheathing having a plurality of diagonal open spaces along the side, and yielding means interposed between the open space and the sheathing.

12. In combination in a packing, a substantially non-elastic core, a resilient sheathing over the core, and a comparatively soft covering over the sheathing.

13. In combination in a packing, a resistant core, a coil spring sheathing loosely applied over the core, and a casing of metal over the sheathing.

In testimony whereof I have hereunto signed my name in the presence of the two subscribed witnesses.

WM. J. KNOX.

Witnesses:
 HARRY T. SMITH,
 ARNOLD WISEMANN.